S. O. DUEMLER.
FIFTH WHEEL.
APPLICATION FILED APR. 10, 1916.
1,195,662.
Patented Aug. 22, 1916.
2 SHEETS—SHEET 1.
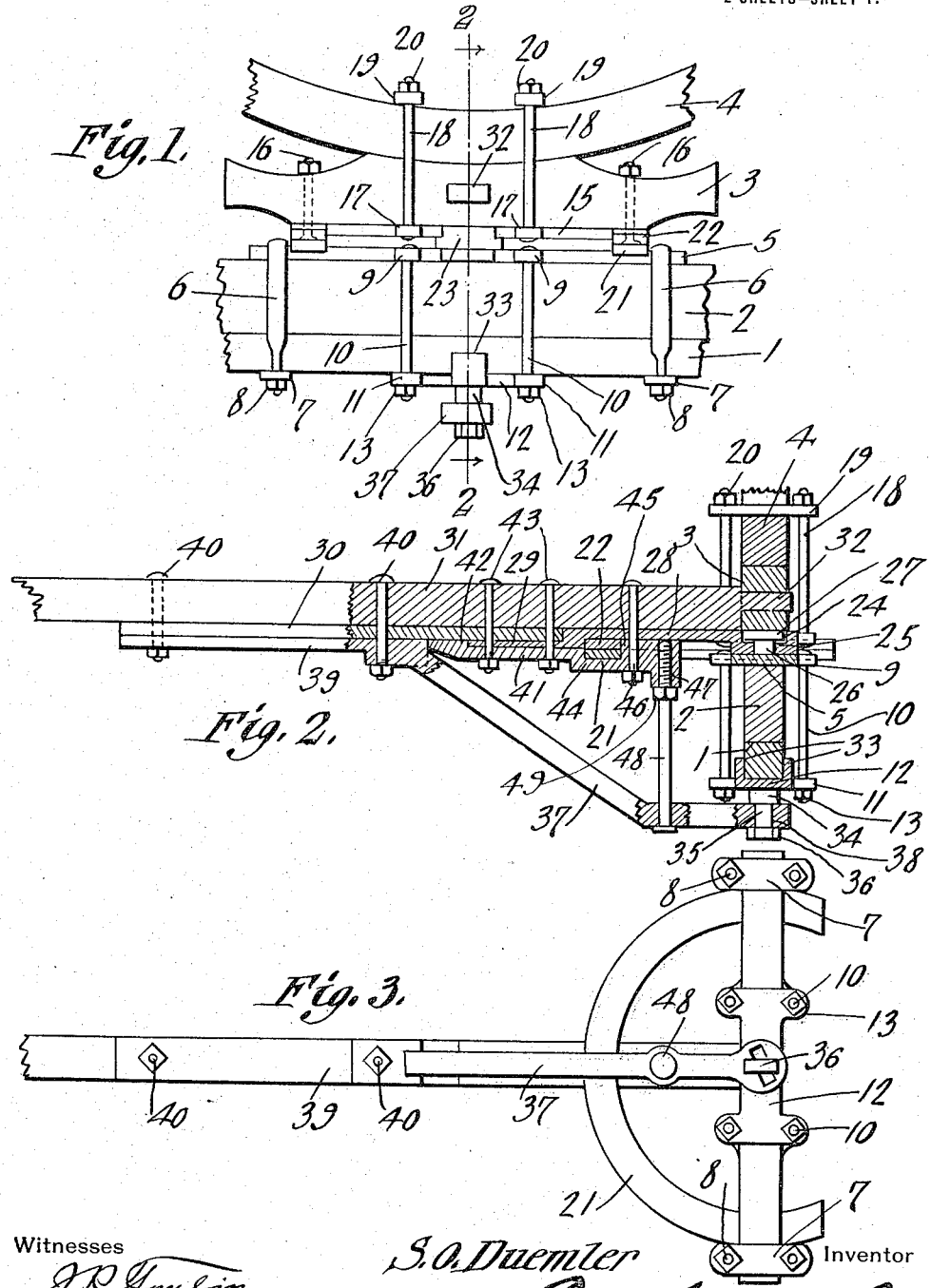
Witnesses
Inventor
S. O. Duemler
by 
Attorneys S. O. DUEMLER.
FIFTH WHEEL.
APPLICATION FILED APR. 10, 1916.
1,195,662.
Patented Aug. 22, 1916.
2 SHEETS—SHEET 2.
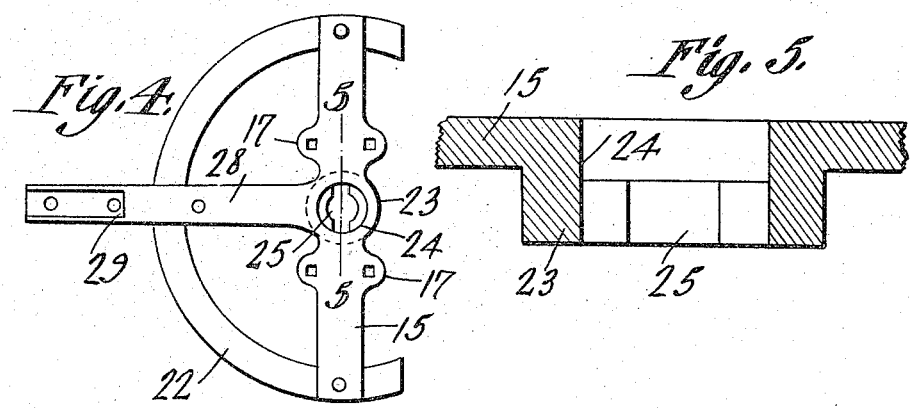
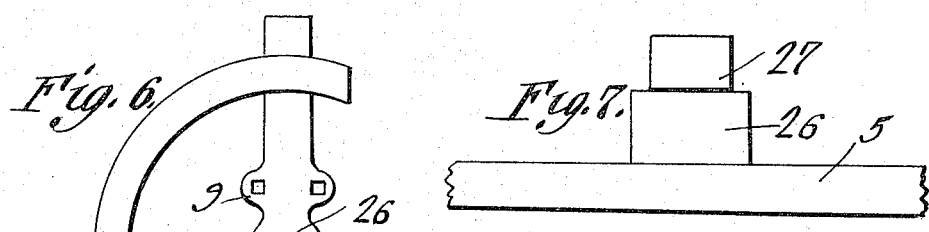
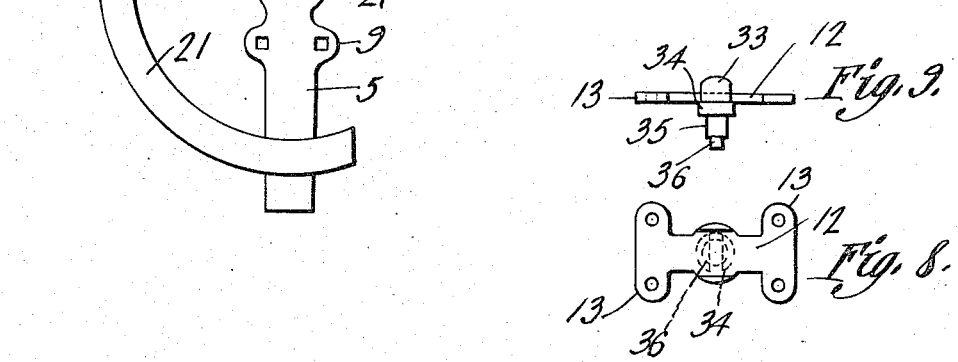
Witnesses
S. O. Duemler
Inventor
by
Attorneys

UNITED STATES PATENT OFFICE.

SAMUEL O. DUEMLER, OF SPRINGFIELD, MISSOURI.

FIFTH-WHEEL.

1,195,662.  Specification of Letters Patent.  Patented Aug. 22, 1916.

Application filed April 10, 1916. Serial No. 90,198.

*To all whom it may concern:*

Be it known that I, SAMUEL O. DUEMLER, a citizen of the United States, residing at Springfield, in the county of Greene and State of Missouri, have invented a new and useful Fifth-Wheel, of which the following is a specification.

The present invention appertains to fifth wheels, and aims to provide a novel and improved fifth wheel structure for wagons and other vehicles.

It is the object of the invention to provide a fifth wheel structure which is thoroughly substantial in construction, the parts of which can be readily assembled and taken apart, and which is improved generally in its details to enhance the utility and efficiency thereof.

With the foregoing and other objects in view which will appear as the description proceeds, the invention resides in the combination and arrangement of parts and in the details of construction hereinafter described and claimed, it being understood that changes in the precise embodiment of the invention herein disclosed can be made within the scope of what is claimed without departing from the spirit of the invention.

The invention is illustrated in the accompanying drawings, wherein:

Figure 1 is a front view of the fifth wheel structure. Fig. 2 is a longitudinal section taken on the line 2—2 of Fig. 1, portions being shown in elevation. Fig. 3 is a bottom plan view. Fig. 4 is a plan view of the upper fifth wheel member. Fig. 5 is an enlarged sectional detail taken on the line 5—5 of Fig. 4. Fig. 6 is a plan view of the lower fifth wheel member. Fig. 7 is a fragmental elevation of the lower fifth wheel member showing the king bolt or stud thereof. Fig. 8 is a plan view of a fifth wheel plate which is used, and Fig. 9 is an elevation thereof.

In the drawings, there is illustrated the axle 1 upon which is mounted the axle cap 2, and there is also depicted the bolster or head block 3 upon which is mounted a part 4, which can be taken to represent a bunk, spring or other part of the wagon or vehicle.

In carrying out the invention, there is disposed upon the member 2 an elongated plate 5 constituting a portion of the lower fifth wheel member, and the ends of said plate are secured upon the member 2 by means of U-shaped bolts 6 straddling the plate 5, member 2 and axle 1, and having washer plates 7 fitted upon their lower terminals. Nuts 8 are threaded upon the terminals of the bolts 6 to clamp the plate 5, member 2 and axle 1 together, whereby the plate 5 will be held firmly in place. The plate 5 is provided between its ends with outstanding ears 9 through which bolts 10 are engaged and said bolts are also engaged through the outstanding ears 11 of a fifth wheel plate 12 resting against the lower surface of the axle 1. Nuts 12 are threaded upon the lower ends of the bolts 10, thereby to clamp the plate 12 against the axle 1, and to assist in clamping the plate 5 upon the member 2.

Fitting the lower surface of the bolster 3 is an elongated plate 15, constituting a part of the upper fifth wheel member, and the ends of said plate 15 are attached to the bolster 3 by means of bolts 16 or other suitable securing means. The edges of the plate 15 are provided between their ends with outstanding ears 17 through which bolts 18 are engaged, said bolts projecting upwardly, and having washer bars 19 engaged upon their upper terminals and seated upon the member 4. Nuts 20 are threaded upon the upper ends of the bolts 18, to clamp the plate 15, bolster 3 and member 4 together, whereby to hold the upper fifth wheel member in place, assisted by the bolts 16. Secured to the plates 5 and 15 are the respective arcuate fifth wheel members 21 and 22, which bear against one another, and which are disposed at the rear of said plates.

The plate 15 is provided with a central depending boss 25 seating upon the central portion of the lower fifth wheel plate 5, and said boss 23 has an upper recess 24 and a double key-hole-shaped slot 25 extending from the bottom of the recess to the lower surface of the boss 23. The central portion of the plate 5 is provided with an upstanding stud 26 journaled within the central circular portion of the slot 25, and provided with a T-head 27 within the recess 24 and out of alinement, normally, with the slot 25, whereby to lock the two fifth wheel members together, although they can be separated when they are so rotated at an angle of approximately 90 degrees relative to one another.

The plate 15 has an integral rearwardly projecting rigid strap 28, whose rear terminal is offset downwardly, as at 29, to fit in rear of the upper fifth wheel member 22.

A plate or bar 30 is disposed at the lower surface of the reach bar 31, and extends over the downwardly offset portion 29, the forward end of the reach bar 31 having a tenon 32 secured within the bolster or beam 3. The strap 28 is attached to the reach bar, as will hereinafter more fully appear.

The forward and rear edges of the plate 12 have upstanding ears 33 straddling the axle 1, to assist in holding said plate in place relative to the axle, and said plate 12 has a central depending boss 34 provided with a depending stud 35 having at its lower end a T-head 36. The stud 35 is adapted for assemblage with a rearwardly extending brace 37, whose forward terminal is provided with a double key-hole-shaped slot 38 for the passage of the head 36, and for the normal reception of the stud 35 within the central circular portion thereof. The head 36 is normally out of alinement with the slot 38, but when the brace 37 and plate 12 are swung at a proper abnormal angle, the head 36 and slot 38 will register so that the brace 37 and plate 12 can be separated. The brace 37 normally fits between the boss 34 and head 36, and its rear upper terminal has a rearwardly extending strap 39 fitting against the plate 30. Said plate 30 and strap 39 are secured to the reach bar by means of a suitable number of bolts 40.

A longitudinal strap 41 is disposed below the strap 28, and has a rear shoulder 42 fitting the end of the offset portion 29. Said strap 41 has an offset portion 44 fitting the lower fifth wheel member 21, and has a portion or enlargement 45 at its forward end fitting in front of the two fifth wheel members. The strap 41 is attached, together with the offset portion 29 and plate 30, to the reach bar 31 by a suitable number of bolts 43, and the enlargement 45 and strap 28 are attached to the reach bar by means of a bolt 46. The enlargement 45 has a vertical bore 47 in which is threaded the upper terminal of a bolt 48 which has its lower end engaged through the brace 37 to support the lower terminal of said brace and to steady it. A lock nut 49 is threaded upon the bolt 48 and bears against the enlargement 45 to prevent the loosening of the bolt.

By reason of the assemblage of the component elements as above described, the structure will be thoroughly substantial, to withstand the strains to which it is subjected, and the device provides a highly desirable and effective one of the intended purposes.

Having thus described the invention, what is claimed as new is:

A fifth wheel comprising a pair of plates, one having a slot, and the other having a stud journaled in said slot and provided with a head normally out of alinement with said slot to hold said plates assembled, arcuate fifth wheel members attached to said plates and bearing against one another, the upper plate having a strap projecting therefrom, a strap below said strap and adapted to be secured therewith to a reach bar, said straps having means for accommodating the fifth wheel members therebetween, a third plate below the aforesaid plates and adapted to be connected with the lowermost thereof, a brace attachable to the reach bar, the strap and third plate having interengageable means including a slot and a stud journaled in said slot, the last mentioned stud having a head to hold the third plate and brace assembled, and means for attaching the brace and second mentioned strap to steady the brace.

In testimony that I claim the foregoing as my own, I have hereto affixed my signature in the presence of two witnesses.

SAMUEL O. DUEMLER.

Witnesses:
CHAS. W. RULE,
JAMES A. MOON.

Copies of this patent may be obtained for five cents each, by addressing the "Commissioner of Patents, Washington, D. C."